United States Patent
Seacat DeLuca et al.

(10) Patent No.: US 10,482,089 B2
(45) Date of Patent: Nov. 19, 2019

(54) SEARCH RESULT OPTIMIZATION BASED ON PREVIOUS SOLUTIONS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 14/567,878

(22) Filed: Dec. 11, 2014

(65) Prior Publication Data
US 2016/0170992 A1 Jun. 16, 2016

(51) Int. Cl.
*G06F 17/30* (2006.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
USPC ....... 707/607, 608, 609, 687, 705, 790, 813, 707/821
See application file for complete search history.

(56) References Cited

U.S. PATENT DOCUMENTS

| | | | |
|---|---|---|---|
| 8,386,478 B2 | 2/2013 | Wang | |
| 8,615,514 B1 | 12/2013 | Fernandes et al. | |
| 8,910,201 B1 * | 12/2014 | Zamiska | H04N 21/44222 725/34 |
| 2009/0006358 A1 | 1/2009 | Morris et al. | |
| 2011/0270828 A1 | 11/2011 | Varma et al. | |
| 2013/0004675 A1 | 1/2013 | Birka et al. | |
| 2013/0007587 A1 * | 1/2013 | Marantz | G06F 16/9535 715/234 |

OTHER PUBLICATIONS

IBM, "Answers," <http://answers.tap.ibm.com>, Aug. 15, 2014, 4 pages.
Evernote, <https://evernote.com>, Aug. 15, 2014, 4 pages.

* cited by examiner

*Primary Examiner* — Sana A Al-Hashemi
(74) *Attorney, Agent, or Firm* — Jordan IP Law, LLC

(57) ABSTRACT

Methods and computer program products relate to indicating search result relevancy that includes accepting a first set of query terms from a user, providing the user with a first set of search results corresponding to the first set of query terms, accepting from the user at least one indication of result relevancy from the first set of search results, accepting a second set of query terms from the user, the second set of query terms including the same or similar query terms to the first set of query terms, providing the user with a second set of search results corresponding to the second set of query terms, the second set of search results including one or more search results from the first set of search results, and including the indication of result relevancy in the second set of search results.

20 Claims, 3 Drawing Sheets

200

Help Troubleshoot the Blue Screen of Death with ...      *correct solution* — 210
www.howtonerd.com/.../how-to-troubleshoot-the-blue-screen-of-death/
When you get the Blue Screen of Death, it's important not to panic and to follow the following steps to restore...

Blue Screen of Death Survival Guide — 220
www.pcbluescreen.com/.../blue_screen_death_survival_gui...
The Blue Screen of Death is less of a problem on more recent operating systems than in past operating systems. However, for those of you with older operating systems, the following advice...

10 tips for coping with blue screen errors – World of Tech — 230
www.worldoftech.com/.../10-tips-for-coping-with-blue-scr...
Sometimes it is hard to determine a cause for the blue screen that appears as an unwelcome start-up screen on your monitor. Various diagnostic programs exist that you can use to help diagnose the source of the problem...

Why am I repeatedly getting a Blue Screen | The ... — 240
technoplace.com/.../why-am-i-repeatedly-g...
If you choose to restart your PC after receiving a blue screen you may miss potential error messages, especially if your PC decides to restart automatically before you have the opportunity to read...

Fixing the Blue Screen of Death - computerfixer — 250
www.computerfixer.com/fixing-the-blue-screen-of-death/
In this guide, you will learn how to fix the blue screen of death. First, it is best to try to access the report on the cause of your particular blue screen error...

What should I do if I see a screen that is solid blue... ... — 260
https://support.bluescreen.com/.../what-should-i-do-if-i-see-a-screen-
After logging onto my computer, the screen suddenly turned to a solid blue color with no error message or report of any kind. How do I restore my system...

FIG. 2

SEARCH RESULT OPTIMIZATION BASED ON PREVIOUS SOLUTIONS

BACKGROUND

Embodiments of the present invention generally relate to indications of search result relevancy. More particularly, embodiments relate to indicating search result relevancy from a first search when presenting search results for a second, similar search.

Using hypertext, a link is a selectable connection from one word, picture, or information object to another. When a user views content that contains links to other content, content that has been visited in the past is typically displayed in a different format. Under such an approach, however, the user may not have any other information regarding a previous visit to the content. For example, a user may perform a search that is similar to a search previously performed, wherein upon viewing the search results, the user may recall that particular content was relevant to an issue presented in the search. Since several links may be highlighted, indicating previous visits, the user may not be able to recall which link is the previously-visited relevant result.

BRIEF SUMMARY

Embodiments may include a method of indicating search result relevancy that includes accepting a first set of query terms from a user, providing the user with a first set of search results corresponding to the first set of query terms, accepting from the user at least one indication of result relevancy from the first set of search results, accepting a second set of query terms from the user, the second set of query terms including the same or similar query terms to the first set of query terms, providing the user with a second set of search results corresponding to the second set of query terms, the second set of search results including one or more search results from the first set of search results, and including the indication of result relevancy in the second set of search results.

Embodiments may also include a computer program product to identify relevant search results, the computer program product including a computer readable storage medium having program instructions embodied therewith, the program instructions executable by a computer to cause the computer to accept a first set of query terms from a user, provide the user with a first set of search results corresponding to the first set of query terms, accept from the user at least one indication of result relevancy from the first set of search results, accept a second set of query terms from the user, the second set of query terms including the same or similar query terms to the first set of query terms, provide the user with a second set of search results corresponding to the second set of query terms, the second set of search results including one or more search results from the first set of search results, and include the at least one indication of result relevancy in the second set of search results.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 2 is an example of a search result display according to an embodiment; and

DETAILED DESCRIPTION

Figure 1:
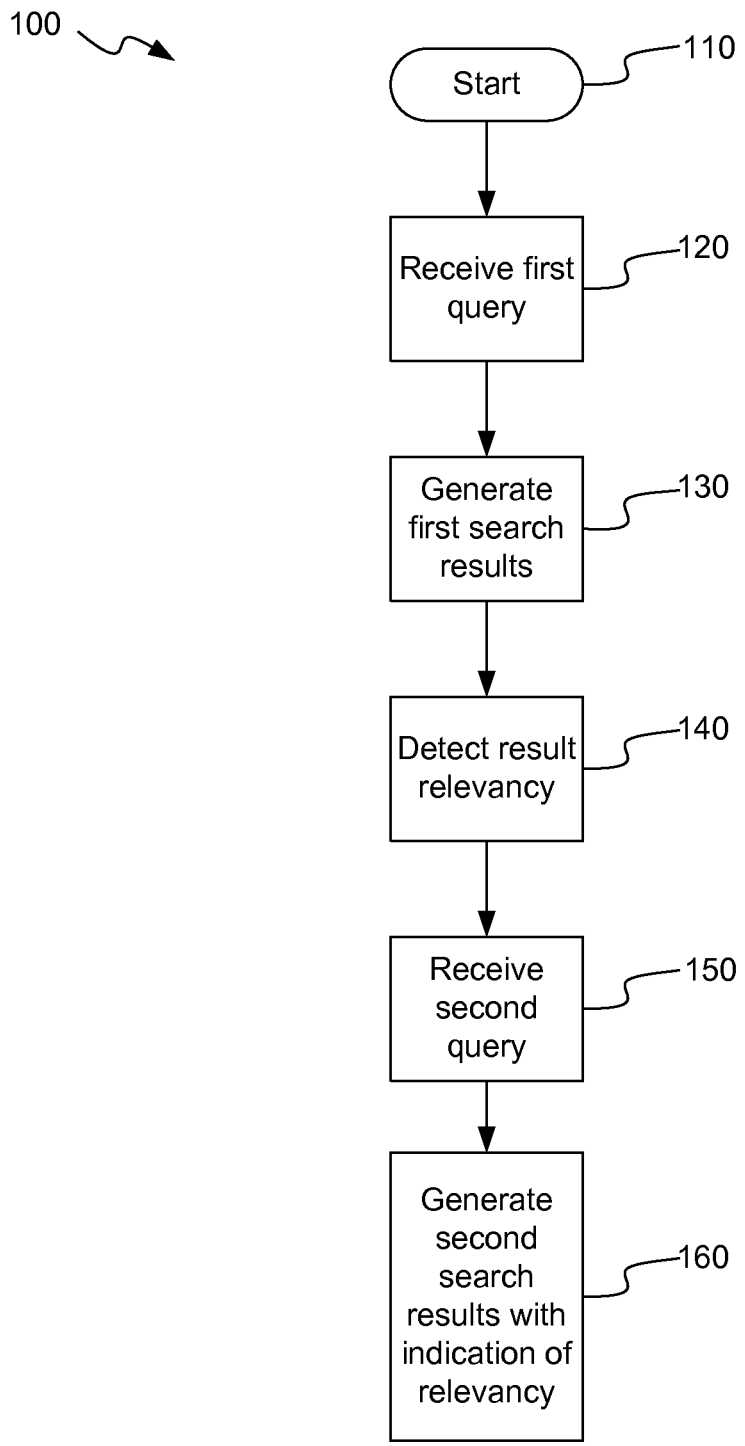
FIG. 1 is a block diagram of an example of a method of indicating search result relevancy according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a method 100 of indicating search result relevancy is shown relative to a previously-accessed link that had been presented as a result to a first search query. The method 100 may be performed using a browser, a browser plug-in or any other tool that can accept the search result relevancy as indicated by a user. Block 110 indicates the start. At block 110, a user may, for example, access a browser or any other type of search tool such as an editor or a collaboration service.

In illustrated block 120, a user inputs a first search query to the browser or other search tool. Upon entering the search, a list of results corresponding to the search may be displayed at block 130 and the user may choose whether or not to visit a particular link listed in the search results. If the user decides to access one or more links, he or she typically clicks on each link and is taken to the respective content associated with that link. Upon viewing the content, the user may find that the content is particularly relevant to the question or issue posed by the first search query.

At block 140, the user may indicate that the link has particularly relevant information. The user may indicate the relevancy in a number of different ways. For example, the user may mark the link as being a correct answer through a browser plug-in, such as through a pop-up query that directs the user to mark the page if he or she finds it of particular relevance. In the alternative, the user may return to the search result page and mark the link as being a "correct answer" directly on the page of search results. In another embodiment, the marking of relevancy may occur based on user activity. For example, if the user spends several minutes viewing a particular result and only seconds viewing the other search results, block 140 may deem that the long-viewed result is particularly relevant and mark it as such. If the user ends the search after viewing content related to a particular link (e.g., by not returning to the search results to view any additional links), block 140 in may deem that the link is a particularly relevant search result.

After a search result has been detected and marked as being relevant or a correct answer to a search query, the information may be saved as a key value pair (e.g., query plus selected answer). The information may be saved locally within a browser or on a cloud-based network retrievable through service calls.

With the information about a search result being relevant or a "correct answer" to a query stored, illustrated block 150 receives a second query from a user. The second search query may be compared with earlier search queries to determine if it is the same or similar to a previous query. Similarities between search queries may be determined based on, for example, similar keywords entered (e.g., a percentage of similar keywords), similar sets of search results returned, and/or natural language query parsing. For example, a search stating "Why am I seeing a blue screen" might be marked as similar to "how to fix a blue screen" because two of the search terms "blue screen" that are non-filler words and non-question words are identical. If the second query is deemed to be similar to an earlier, first query, then the saved indication of search result relevance may be indicated to the user in the second set of search results in block 160.

FIG. 2 depicts embodiments of indicia that may be employed to indicate a relevant link with respect to the second query based on the indication of relevance from the first query. In FIG. 2, the first query might be "why am I seeing a blue screen" while the second query may be "how to fix a blue screen." In the illustrated example, search results 200 are presented. The bold-faced results (element numbers 210, 240, and 260) represent links that have been visited previously by the user. Typically a browser will display these previously-visited links with a different color font that easily distinguishes the content already accessed by a user from search results not previously visited by the user. Links that have not been previously visited by the user are indicated by element numbers 220, 230, and 250. The indication of relevance from the previous search query may be displayed at 210 with a bold-faced rectangle surrounding the search result. Alternatively, the search result may be marked "correct solution" as shown or be displayed with an icon, with highlighting, be displayed as the first result in a list, or any other designation to indicate that it has been previously marked as a correct solution or relevant to an earlier, related search query.

In one embodiment, the search result previously indicated as relevant may be pre-fetched as a result of the second similar search query. Further, the keywords from the first query may be displayed with the relevant search result. The state that the content related to the link was in when it was marked as relevant may optionally be cached so that the user can view the content as it was when it was marked (in the event that the updated page no longer contains the relevant information). Optionally, upon being presented with the second search results, the user may have the same marking opportunity to indicate a relevant URL or a correct answer to a search query.

To save processor resources, the previous search query relevance feature may be optionally employed by the user when performing a search query. When turned "off," no comparison will be made with previous searches and no previously-marked results will be presented to the user. In this manner, the user may determine which searches are likely to have previously-marked search results that are desirable to be presented in a present search without running the feature for all searches.

In a further embodiment, search query "questions" could be expanded to social networks/enterprise networks that the user trusts such that solutions marked as "correct" by social network contacts may be added to the relevant or correct results marked by the user.

Additional features may be employed in other embodiments. For example, multiple relevant/correct solutions may be indicated. If multiple solutions need to be visited in a particular order to properly obtain the information, the marking may include the sequence for visiting. Further options include provision of a details link for additional information regarding the indication of result relevancy, wherein the details link includes information regarding a date of entry of the first set of query terms, the first set of query terms, or technical specifications of the computer used during entry of the first set of query terms. While the above has described embodiments with a browser, the embodiments are applicable to queries in e-mail applications, web applications, mobile applications, or search applications.

Figure 3:
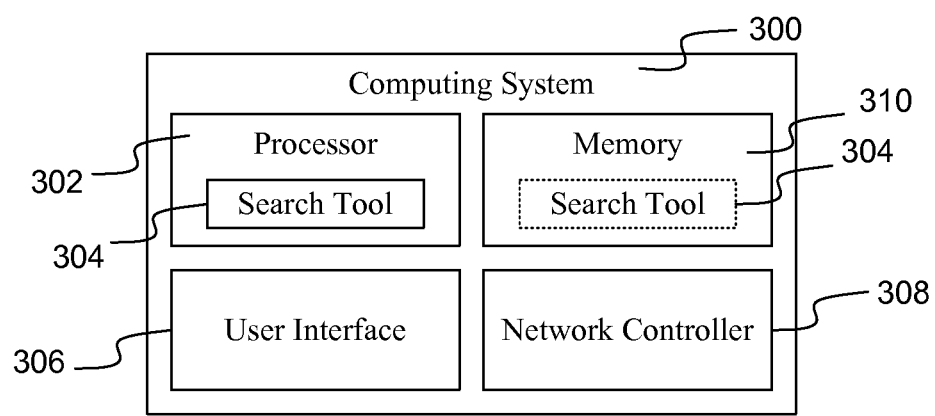
FIG. 3 is a block diagram of an example of a computing system according to an embodiment.

FIG. 3 shows a computing system 300 that may be used to optimize search results as described herein. In the illustrated example, the computing system 300 includes a processor 302 that executes a search tool 304 configured to implement one or more aspects of the method 100 (FIG. 1), already discussed. Thus, the search tool 304 may accept a first set of query terms from a user via a user interface 306, provide the user with a first set of search results corresponding to the first set of query terms, and accept from the user at least one indication of result relevancy from the first set of search results. A network controller 308 may be used to generate the first set of search results. Additionally, the search tool 304 may accept, via the user interface 306, a second set of query terms from the user, the second set of query terms including the same or similar query terms to the first set of query terms, provide the user with a second set of search results corresponding to the second set of query terms, the second set of search results including one or more search results from the first set of search results, and include the at least one indication of result relevancy in the second set of search results. In one example, the processor 302 obtains the search tool 304 from a memory 310 (e.g., non-volatile memory/NVM, volatile memory).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to identify relevant search results, the computer program product comprising a computer readable storage medium having program instructions embodied therewith, the program instructions configured to cause the computer to:

accept a first set of query terms from a user;

provide the user with a first set of search results corresponding to the first set of query terms;

accept from the user at least one indication of result relevancy from the first set of search results based on an amount of actual viewing time of content rendered after selection of a link from the first set of search results, wherein the at least one indication of result relevancy is a result marking from the user based on the actual viewing time of the content rendered after the selection of the link from the first set of search results, where one or more search results are marked as a correct answer to the first set of query terms by the user viewing the content rendered after the selection of the link from the first set of search results and not returning to the first set of search results to view at least one or more other links;

accept a second set of query terms from the user, the second set of query terms including the same or similar query terms to the first set of query terms;

provide the user with a second set of search results corresponding to the second set of query terms, the second set of search results including one or more search results from the first set of search results; and include the at least one indication of result relevancy in the second set of search results, the at least one indication of search result relevancy being a search result reordering indicator based on one or more of the actual viewing time of the content rendered after the selection of the link from the first set of search results or the user viewing the content at rendered after the selection of the link from the first set of search results and not returning to the first set of search results to view the at least one or more other links.

2. The computer program product of claim 1, the program instructions configured to cause the computer to cache search results marked as relevant by the user, and one or more of a state of content or content related to one or more of the first set of search results or the second set of search results corresponding to the at least one indication of result relevancy, wherein the cached state of content or the cached content is viewable by the user when a source of the first set of search results or the second set of search results is updated modifying or eliminating content corresponding to the at least one indication of result relevancy.

3. The computer program product of claim 1, wherein the program instructions are configured to cause the computer to provide a details link for additional information regarding the indication of result relevancy, wherein the details link is to include information regarding a date of entry of the first set of query terms, the first set of query terms, or technical specifications of the computer used during entry of the first set of query terms.

4. The computer program product of claim 1, wherein the program instructions are configured to cause the computer to accept an indication of result relevancy from additional users.

5. The computer program product of claim 1, wherein the program instructions are configured to cause the computer to apply the first set of query terms from the user to an e-mail application, a web application, or a search application.

6. A computer program product to identify relevant search results, the computer program product comprising a computer readable storage medium having program instructions embodied therewith, the program instructions configured to cause the computer to:
　accept a first set of query terms from a user;
　provide the user with a first set of search results corresponding to the first set of query terms;
　accept from the user at least one indication of result relevancy from the first set of search results based on an amount of actual viewing time of content rendered after selection of a link from the first set of search results or by the user viewing the content rendered after the selection of the link from the first set of search results and not returning to the first set of search results to view at least one or more other links;
　accept a second set of query terms from the user, the second set of query terms including the same or similar query terms to the first set of query terms;
　provide the user with a second set of search results corresponding to the second set of query terms, the second set of search results including one or more search results from the first set of search results; and
　include the at least one indication of result relevancy in the second set of search results, the at least one indication of result relevancy being a search result reordering indicator based on one or more of the actual viewing time of the content rendered after the selection of the link from the first set of search results or the user viewing the content rendered after the selection of the link from the first set of search results and not returning to the first set of search results to view the at least one or more other links.

7. The computer program product of claim 6, wherein the program instructions are configured to cause the computer to:
　accept the at least one indication of result relevancy as result marking from a user based on the actual viewing time of the content rendered after the selection of the link from the first set of search results or the user viewing the content rendered after the selection of the link from the first set or the second set of search results and not returning to the search results to view the at least one or more other links where one or more search results are marked as a correct answer to the first set of query terms; and
　cache one or more of a state of content or content related to one or more of the first set of search results or the second set of search results corresponding to the at least one indication of result relevancy, wherein the cached state of content or the cached content is viewable by the user when a source of the first set of search results or the second set of search results is updated modifying or eliminating content corresponding to the at least one indication of result relevancy, wherein the result marking by the user is through a browser plug-in, a popup query, the user selection of a search result from a search result page, the user ending a search, or duration of time spent by the user on a search result.

8. The computer program product of claim 6, wherein the program instructions are configured to cause the computer to provide a details link for additional information regarding the indication of result relevancy, wherein the details link is to include information regarding a sequence of viewing search results when multiple results are indicated as relevant.

9. The computer program product of claim 6, wherein the program instructions are configured to cause the computer to accept an indication of result relevancy from additional users.

10. The computer program product of claim 6, wherein the program instructions are configured to cause the computer to apply the first set of query terms from the user to an e-mail application, a web application, or a search application.

11. A method of indicating search result relevancy comprising:
　accepting a first set of query terms from a user;
　providing the user with a first set of search results corresponding to the first set of query terms;
　accepting from the user at least one indication of result relevancy from the first set of search results based on an amount of actual viewing time of content rendered after selection of a link from the first set of search results or by the user viewing the content rendered after the selection of the link from the first set of search results and not returning to the first set of search results to view at least one or more other links;
　accepting a second set of query terms from the user, the second set of query terms including the same or similar query terms to the first set of query terms;
　providing the user with a second set of search results corresponding to the second set of query terms, the second set of search results including one or more search results from the first set of search results; and
　including the indication of result relevancy in the second set of search results, wherein the indication of result relevancy is a search result reordering indicator based on one or more of the actual viewing time of the content rendered after the selection of the link from the first set of search results or the user viewing the content rendered after the selection of the link from the first set of search results and not returning to the first set of search results to view the at least one or more other links.

12. The method of claim 11, further comprising:
　accepting a search result marking from a user based on the actual viewing time of the content rendered after the selection of the link from the first set of search results or the user viewing the content rendered after the selection of the link from the first set or second set of search results and not returning to the search results to view the at least one or more other links where one or more search results are marked as a correct answer to the first set of query terms; and caching one or more of a state of content or content related to one or more of the first set of search results or the second set of search results corresponding to the at least one indication of result relevancy, wherein the cached state of content or the cached content is viewable by the user when a source of the first set of search results or the second set of search results is updated modifying or eliminating content corresponding to the at least one indication of result relevancy.

13. The method of claim 12, wherein the user marking is through a browser plug-in, a popup query, the user selection of a search result from a search result page, the user ending a search, or duration of time spent by the user on a search result.

14. The method of claim 11, further comprising displaying the second set of search results with an indicator of search result relevancy.

15. The method of claim 14, wherein the indicator of search result relevancy is a visual indicator selected from style, color, or font display of search results, an icon indicator, or a pre-fetching indicator.

16. The method of claim 11, further comprising accepting an indication of relevancy from the user for the second set of search results.

17. The method of claim 11, further comprising providing a details link for additional information regarding the indication of result relevancy selected from information regarding a date of entry of the first set of query terms, the first set of query terms, technical specifications of the computer used during entry of the first set of query terms or an order for viewing search results when multiple search results are indicated as relevant.

18. The method of claim 11, further comprising caching search results indicated as relevant by the user.

19. The method of claim 11, further comprising accepting an indication of result relevancy from additional users.

20. The method of claim 11, further comprising applying the first set of query terms from the user to an e-mail application, a web application, or a search application.

* * * * *